United States Patent
Zellman (10) Patent No.: US 11,756,405 B2
(45) Date of Patent: Sep. 12, 2023

(54) SUBMERSION SENSOR

(71) Applicant: Matthew Zellman, Ceres, CA (US)

(72) Inventor: Matthew Zellman, Ceres, CA (US)

( * ) Notice: Subject to any disclaimer, the term of this patent is extended or adjusted under 35 U.S.C. 154(b) by 0 days.

(21) Appl. No.: 17/849,709

(22) Filed: Jun. 27, 2022

(65) Prior Publication Data

US 2023/0023999 A1  Jan. 26, 2023

Related U.S. Application Data

(60) Provisional application No. 63/225,698, filed on Jul. 26, 2021.

(51) Int. Cl.
*G08B 21/18* (2006.01)
*G01L 7/22* (2006.01)

(52) U.S. Cl.
CPC .............. *G08B 21/182* (2013.01); *G01L 7/22* (2013.01)

(58) Field of Classification Search
CPC ................................. G08B 21/182; G01L 7/22
USPC ........................................................ 340/540
See application file for complete search history.

(56) References Cited

U.S. PATENT DOCUMENTS

| | | | | |
|---|---|---|---|---|
| 4,755,806 A * | 7/1988 | Villarreal | ............. | G08B 21/182 340/572.1 |
| 4,775,854 A * | 10/1988 | Cottrell | ................. | G08B 21/084 340/689 |
| 5,619,187 A | 4/1997 | Serfontein | | |
| 6,129,036 A | 10/2000 | King et al. | | |
| 6,370,084 B1 * | 4/2002 | Cray | .................... | G10K 11/006 367/176 |
| 8,144,020 B2 | 3/2012 | Snyder et al. | | |
| 9,457,900 B1 * | 10/2016 | Jones | .................... | B64C 39/024 |
| 9,461,605 B2 | 10/2016 | Sekiyama | | |
| 9,595,178 B2 * | 3/2017 | Snyder | ................ | G08B 21/088 |
| 10,692,348 B2 | 6/2020 | Ruchti | | |
| 10,943,459 B2 | 3/2021 | Kurata | | |
| 2005/0035866 A1 * | 2/2005 | Hatherell | ............. | G08B 21/084 340/573.6 |
| 2009/0295566 A1 | 12/2009 | Weintraub | | |
| 2010/0103231 A1 * | 4/2010 | Iwamura | ............... | B41J 2/17566 347/86 |
| 2010/0176956 A1 * | 7/2010 | Moerschell | ............... | E04H 4/06 340/626 |
| 2014/0008296 A1 * | 1/2014 | Mills | ....................... | C02F 3/006 210/123 |
| 2014/0361887 A1 * | 12/2014 | Eskildsen | .............. | G08B 25/10 340/539.1 |
| 2016/0178428 A1 * | 6/2016 | Zuchlewski | ............ | G01F 23/74 340/623 |
| 2016/0180683 A1 * | 6/2016 | Fourie | ....................... | E04H 4/06 340/573.6 |

(Continued)

*Primary Examiner* — Zhen Y Wu (74) *Attorney, Agent, or Firm* — Nolan Heimann LLP; Adam Diament (57) ABSTRACT

A submersion sensor for detecting submersion in a fluid is disclosed. The submersion sensor includes at least one float member and at least one sink member. The submersion sensor includes force sensors positioned at distal ends of each of the at least one float member and the at least one sink member. Further, the submersion sensor includes a controller. The controller determines submersion of the submersion sensor upon obtaining signals from the force sensors corresponding to opposite directional movement of the at least one float member and the at least one sink member in the fluid.

20 Claims, 5 Drawing Sheets

(56) References Cited

U.S. PATENT DOCUMENTS

| | | |
|---|---|---|
| 2017/0158289 A1* | 6/2017 | Adams .................... G08G 3/00 |
| 2020/0286359 A1 | 9/2020 | Artzt et al. |
| 2020/0334969 A1 | 10/2020 | Harris |
| 2021/0012638 A1* | 1/2021 | Jalilian ................. G08B 21/20 |

* cited by examiner

SUBMERSION SENSOR

CROSS-REFERENCE TO RELATED APPLICATIONS

This application claims priority to U.S. Provisional Patent Application No. 63/225,698, filed Jul. 26, 2021, the contents of which are incorporated by reference in its entirety.

FIELD OF THE DISCLOSURE

The present invention relates to a sensor, and more specifically, to a sensor capable of determining submersion in a fluid.

BACKGROUND OF THE INVENTION

Many people use their leisure or vacation time to relax or enjoy hobbies while playing or swimming in water such as in a swimming pool, water park, or sea. Playing or swimming in the water always poses a danger of drowning.

Several systems have been disclosed in the past that help a person from death by drowning or detect submersion of an object or person in the water. One such example is disclosed in a United States Pub No. 20200334969, entitled "Child Water Safety Bracelet System" ("the '969 Publication"). The '969 Publication discloses a child water safety bracelet system for alerting parents to their children's entering water. The child water safety bracelet system includes at least one child bracelet and a parent bracelet. The child bracelet comprises a first housing and a first wristband configured to secure the first housing to a child's wrist. A water sensor, a first CPU, a first battery, and a transmitter are coupled within a first inner cavity of the first housing. The first CPU sends an alarm signal through the transmitter when the water sensor detects water. The parent bracelet comprises a second housing and a second wristband configured to secure the second housing to a parent's wrist. A speaker, a second CPU, a second battery, and a receiver are coupled within a second inner cavity of the second housing. The second CPU activates the speaker to produce the alarm sound when the receiver receives the alarm signal from the transmitter.

Another example is disclosed in a U.S. Pat. No. 10,943,459, entitled "Fall-into-water accident determination system and fall-into-water accident determination method" ("the '459 Patent"). The '459 Patent discloses a fall-into-water accident determination system that includes a weight detector configured to be attached to an occupant of a vessel and configured to detect a weight applied to a foot of the occupant; a water detector configured to be attached to the occupant and configured to detect water; and a fall-into-water accident determinator configured to determine whether a fall-into-water accident in which the occupant falls into water from the vessel occurs. The fall-into-water accident determinator determines whether the weight changes based on a detection result of the weight detector. The fall-into-water accident determinator determines whether the occupant is immersed in water based on a detection result of the water detector. And the fall-into-water accident determinator determines that the fall-into-water accident occurs when the weight changes and the occupant is immersed in water.

Another example is disclosed in a Chinese Patent No. 105279901, entitled "Wearable device used for drowning help seeking and realization method thereof" ("the '901 Patent"). The '901 Patent discloses a wearable device used for drowning help seeking and a realization method thereof. The device comprises a power supply, a mechanical drowning sensor, a positioning module, a storage module, a processor and a wireless transmission module, wherein the mechanical drowning sensor, the positioning module, the storage module, the processor and the wireless transmission module are connected with the power supply. The positioning module is used for real-time positioning and stores positioning information in the storage module. The mechanical drowning sensor is used for using a mechanical structure to sense water pressure, and issuing a high level to the processor when the sensed water pressure is greater than a set value. The processor is used for receiving the high level and controlling the wireless transmission module to send out the positioning information in the storage module. The wearable device further comprises a receiving terminal. The receiving terminal is used for receiving the positioning information. According to the invention, the false alarm rate of drowning alarm is effectively reduced; in the case of drowning, the positioning module carries out real-time positioning; the receiving terminal can receive the latest position information in real time; and the accuracy and the timeliness of positioning are improved.

Yet another example is disclosed in a U.S. Pat. No. 10,692,348, entitled "Device and method for protecting against swimming accidents, in particular for the early detection of drowning persons, and the like" ("the '348 Patent"). The '348 Patent discloses a device for monitoring persons in the water. The device comprises a carrier apparatus for fastening to a person; a monitoring apparatus held by the carrier apparatus and which has a sensor apparatus and a processor apparatus, wherein the sensor apparatus is connected to the processor apparatus; and a signaling apparatus held by the carrier apparatus and which is connected to the monitoring apparatus, wherein the signaling apparatus has a floatation body and the signaling apparatus is provided for detaching from the carrier apparatus upon a signal of the processor apparatus and rising to the water surface. The invention further relates to a system for monitoring persons in the water, comprising a device for monitoring persons in the water and a base station. The invention further relates to a method and use of the device to protect persons from dangers resulting from a lack of oxygen and drowning.

Although the above-discussed systems incorporating sensors to detect submersion are useful, they have a few problems. For instance, the sensors used to detect submersion in the water or fluid are designed for use at a static location. Further, the sensors are exposed to the environment and as a result the sensors are subject to corrosion. Further, the sensors are not reusable. In addition, the sensors provide a lot of false positives due to humidity or fluid exposure. Furthermore, the sensors can only be deployed in a particular kind of fluid, or are sensitive to the quality or cleanliness of the fluid.

Therefore, there remains a continuing need for improved sensors capable of determining submersion in a liquid.

BRIEF SUMMARY OF THE PRESENT INVENTION

The present invention provides a submersion sensor for detecting submersion in a fluid or liquid. The submersion sensor includes at least one float member and at least one sink member. The submersion sensor includes force sensors positioned at distal ends of each of the at least one float member and the at least one sink member. Further, the submersion sensor includes a controller. The controller determines submersion of the submersion sensor upon obtaining signals from the force sensors corresponding to opposite directional movement of the at least one float member and the at least one sink member in the fluid. In one implementation, each of the force sensors is paired with a high-resistance resistor to increase sensitivity to small forces.

The at least one float member and the at least one sink member have equal mass. The at least one float member and the at least one sink member are arranged in the axes of an octahedron configuration. The octahedron configuration arrangement minimizes the need for correction for dynamic forces on the force sensors.

In one aspect of the present invention, the invention presents an alarm and/or a transceiver. When the controller determines opposite directional movement of the float member and the sink members based on the signals from the force sensors, the controller sends signals to the alarm to produce sound to notify users or people around to indicate detection of submersion. Alternatively, the controller transmits an alert through the transceiver.

In one advantageous feature of the present invention, the submersion sensor detects submersion by detecting the opposite directional movement of floats and sinks. The force sensors do not send signals to the controller when the force sensors get splashed (with drops of water when there is no movement detected by the force sensors) even when the submersion sensor is the fluid. This avoids the false submersion alerts being generated by the force sensors.

DETAILED DESCRIPTION OF EMBODIMENTS

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein. All patents, patent applications and non-patent literature cited through this application are hereby incorporated by reference in their entireties.

Figure 1:
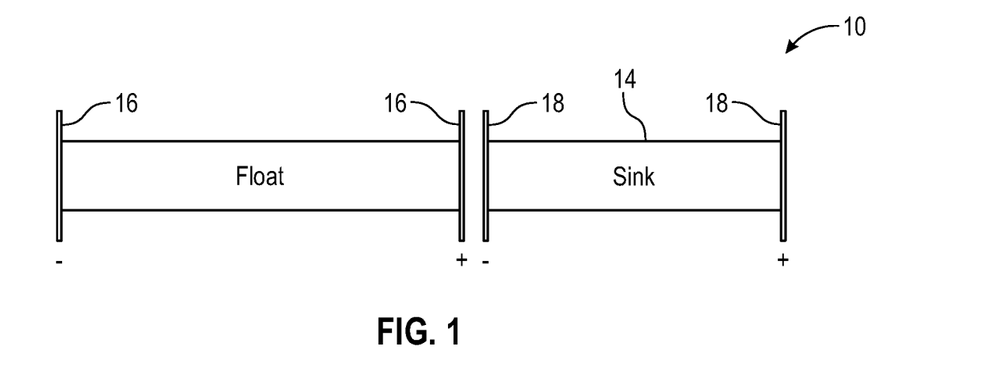
FIG. 1 is a schematic diagram of a submersion sensor, in accordance with one embodiment of the present invention.

Turning to the Figures, FIG. 1 shows a schematic diagram of a submersion sensor 10, in accordance with one embodiment of the present invention. Submersion sensor 10 includes a float member or float or float body 12 and a sink member or sink or sink body 14. In one example, float member 12 and sink member 14 have the same or different shape and size, depending on the need. In one example, each of float member 12 and sink member 14 comes in a rectangular or cylindrical configuration. Float member 12 and sink member 14 position adjacent to each other. Float member 12 and sink member 14 have equal-mass i.e., weight.

In accordance with the present invention, float member 12 includes first force sensors or first force-sensing elements 16. First force sensors 16 position at the distal ends of float member 12. Further, sink member 14 includes second force sensors or second force-sensing elements 18. Second force sensors 18 position at the distal ends of sink member 14. Each of first force sensors 16 and second force sensors 18 includes a force sensitive resistor (FSR) that changes its resistance when a force or pressure is applied.

Figure 2:
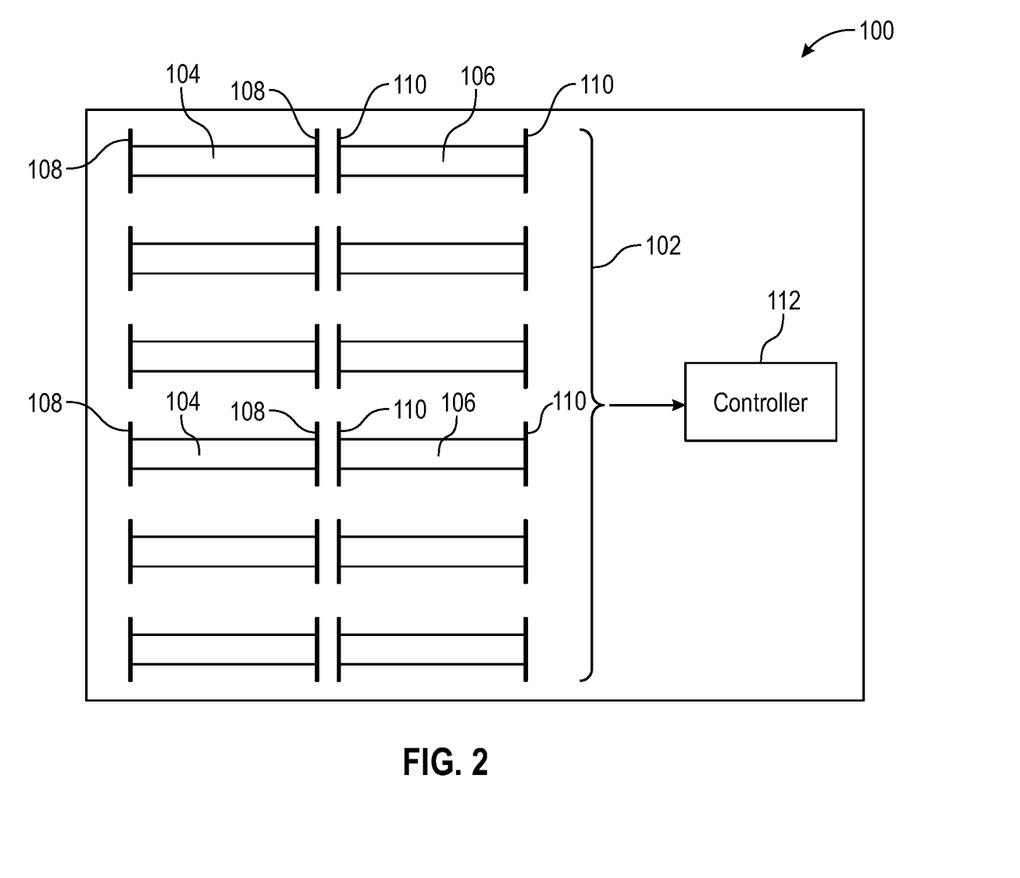
FIG. 2 is a system incorporating the submersion sensor, in accordance with one embodiment of the present invention.

FIG. 2 shows a system 100 incorporating a submersion sensor 102, in accordance with one embodiment of the present invention. Here, system 100 includes, but not limited to, a wearable device, fall-into-water accident determination system, etc. An example of the wearable device includes a bracelet, smart watch, wristband, collar mounted device, specially designed clothing wear, etc. In one implementation, submersion sensor 102 includes a plurality of float members 104 and a plurality of sink members 106. In one example, plurality of float members 104 includes six (6) float members 104. Similarly, plurality of sink members 106 includes six (6) sink members 106. A person skilled in the art understands it is possible to provide more or less than six (6) float members 104 and six (6) sink members 106 in submersion sensor 102 without departing from the scope of the present invention. In the present embodiment, submersion sensor 102 includes six (6) pairs of float members 104 and plurality of sink members 106 arranged in series or one over another as shown in FIG. 2. Each of plurality of float members 104 includes first force sensors 108. First force sensors 108 position at the distal ends of each of plurality of float members 102. Similarly, each of plurality of sink members 106 includes second force sensors 110. Second force sensors 110 position at the distal ends of each of plurality of sink members 106. In one example, each of plurality of float members 104 and plurality of sink members 106 is placed in a porous enclosure depending on the need. Submersion sensor 102 electrically connects to a controller or logic unit 112. Controller 112 includes a "processor device" or an electronic circuit that is configured to receive signals, process the signals, and emit the signals, in particular electrical signals.

Figure 12:
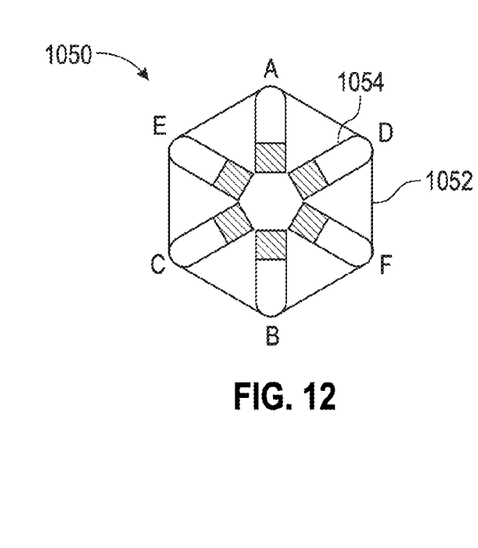
FIG. 12 illustrates an octahedron configuration of the submersion sensor, in accordance with one embodiment of the present invention.

In the present embodiment, 6 pairs of float members 104 and sink members 106, each having equal-mass (or "weights") are constrained in exposed enclosures in order to allow movement only against force sensors 108, 110 (along their shared axis). Here, float members 104 and sink members 106 are arranged along the axes of an octahedron (as shown in FIG. 12, for example). Arranging float members 104 and sink members 106 in the octahedron configuration minimizes the need for correction of dynamic forces on force sensors 108, 110 that are not due to differences in buoyancy between float members 104 and sink members 106.

As shown in FIG. 2, each float member 104 and sink member 106 has two (2) force sensors. As such, six pairs of float members 104 and sink members 106 include a total of twenty-four (24) force sensors 108, 110. Consider calling force sensors 108, 110 as Fx1+(a), Fx1−(b), Sx1+(c), Sx1−(d), Fx2+(e), Fx2−(f), Sx2+(g), Sx2−(h), Fy1+(i), Fy1−(j), Sy1+(k), Sy1−(l), Fy2+(m), Fy2−(n), Sy2+(o), Sy2−(p), Fz1+(q), Fz1−(r), Sz1+(s), Sz1−(t), Fz1+(u), Fz2−(v), Sz2+(w), Sz2−(x). Further, consider the positive (+) and negative (−) sensors on each weight (float member or sink member) to be mutually exclusive. Here, controller 112 obtains signals from each of force sensors 108, 110 and evaluates whether system 100 is submerging in fluid such as water. By evaluating the combination of sensor activations, controller 112 determines if system 100 is submerged in the fluid with a density between the density of float members 104 and the density of sink members 106. Here, controller 112 determines if both float members 104 are pushing opposite directions to both sink members 106 on at least one of the three axes. If float members 104 are pushing opposite directions to both sink members 106, then controller 112 determines system 100 is submerged. In one example, controller 112 executes a logic as: a&d&e&h+i&l&m&p+q&t&u&x=true, in order to determine if system 100 is submerged. In some instances, force sensors 108, 110 experience noise due to erratic motion of float members 104 and sink members 106. In such scenarios, controller 112 makes the determination of "submerged" by averaging over some short time frame to correct the noise.

In accordance with the present invention, force sensors 108, 110 do not send signals to controller 112 when force sensors 108, 110 get splashed when system 100 is the fluid. As a result, the false submersion alerts are avoided. Force sensors 108, 110 are configured to be specific to a particular fluid density, or to be as general as possible to perform against immersion in any fluid. Further, force sensors 108, 110 do not provide false positives for high humidity or incidental contact with a potentially submerging fluid. Force sensors 108, 110 provide real-time readings to controller 112 about the submersion i.e., float members 104 and sink members 106 pushing in opposite directions regardless of the exposure. Submersion sensor 102 does not get corroded as a direct consequence of sensitive functions. Further, submersion sensor 102 is designed such that submersion sensor 102 is not sensitive to the quality, cleanliness, conductivity, polarity, or any qualities of the submerging fluid other than its density.

In one exemplary implementation, system 100 includes an alarm (not shown). The alarm communicatively connects to controller 112. When controller 112 determines opposite directional movement of float members 104 and sink members 106 based on the signals from force sensors 108, 110, controller 112 sends signals to the alarm to produce sound o to notify users or people around to indicate system 100 is submerging in the fluid. In one example, the system 100 includes a transceiver. When controller 112 determines opposite directional movement of float members 104 and sink members 106, controller 112 transmits the alert through the transceiver.

A person skilled in the art understands other sensors such as simple switches, linear or angular displacement sensors, etc. can also be used in place of force sensors 108, 110. Such sensors can be configured to measure the behaviour of float members 104 opposite to the behaviour of sink members 106.

Figure 3:
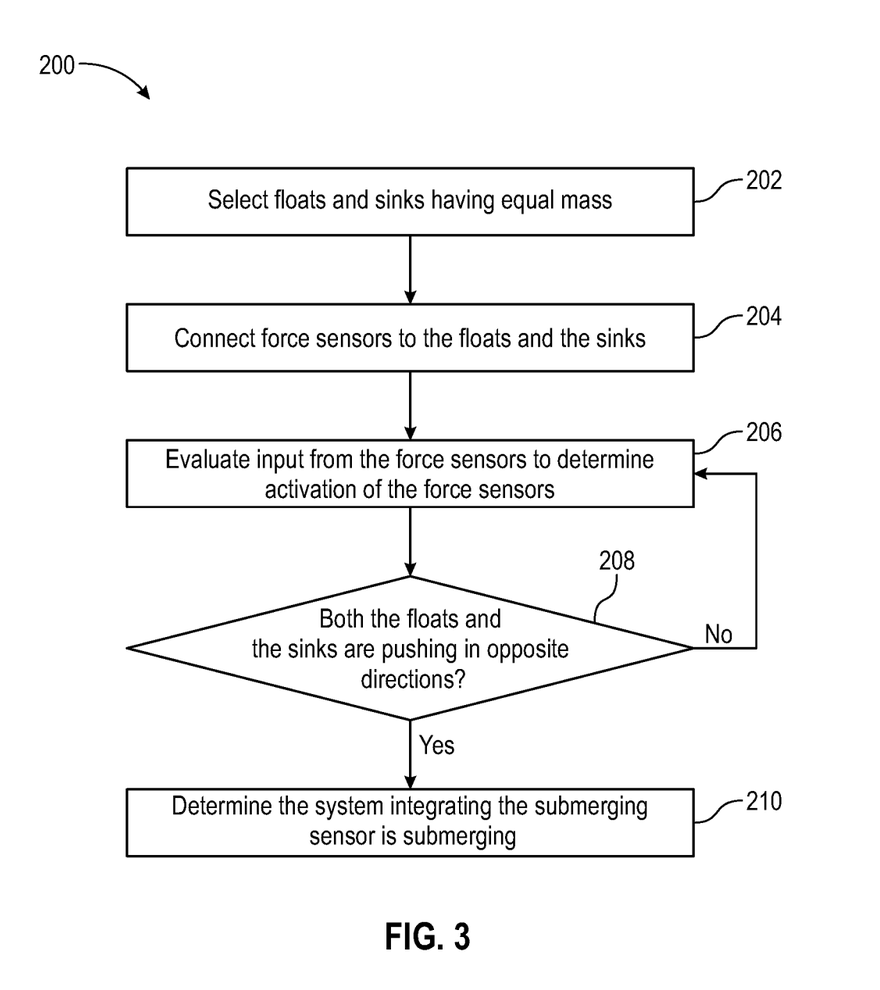
FIG. 3 is a method for determining submerging in a fluid, in accordance with one embodiment of the present invention.

Now referring to FIG. 3, a method 200 for determining submerging in a fluid is explained, in accordance with one embodiment of the present invention. The order in which method 200 is described and is not intended to be construed as a limitation, and any number of the described method blocks can be combined in any order to implement method 200 or alternate methods. Additionally, individual blocks may be deleted from method 200 without departing from the scope of the disclosure described herein. Method 200 is implementable using system 100 described above.

Method 200 starts at step 202. At step 202, floats or float members 104 and sink members or sinks 106 having equal mass are selected. As specified above, equal number of float members 104 and sink members 106 are selected. At step 204, force sensors 108, 110 are connected at the distal ends of each of float members 104 and sink members 106.

At step 206, controller 112 determines activation of force sensors 108, 110 and evaluates the input from force sensors 108, 110. At step 208, controller 206 checks whether both float members 104 and sink members 106 are pushing in opposite directions. If both float members 104 and sink members 106 are pushing in opposite directions, then controller 112 determines that system 100 is submerging, as shown at step 210. If controller 112 does not detect change in position of both float members 104 and sink members 106 from force sensors 108, 110, then method 200 moves back to step 206.

Figure 4:
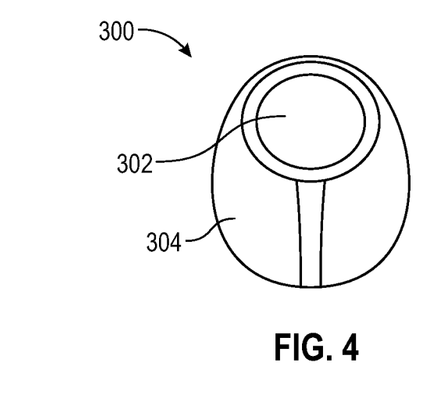
FIG. 4, FIG. 5 and FIG. 6 illustrate variations of a float system, in accordance with one embodiment of the present invention.
Figure 5:
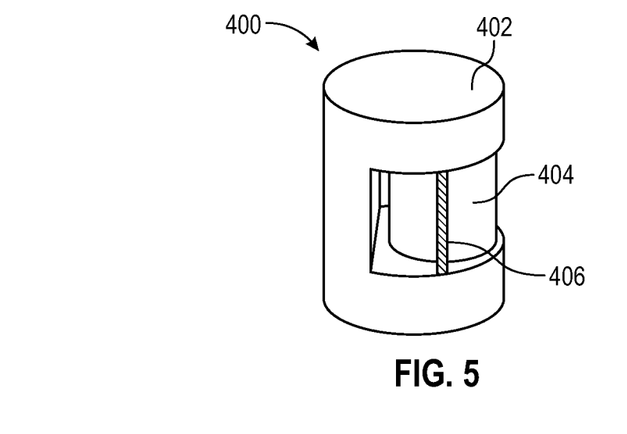

FIG. 4 shows a float system 300, in accordance with one exemplary embodiment of the present invention. Here, float system 300 includes a float member 302 surrounded by a diaphragm 304. FIG. 5 shows a float system 400, in accordance with another exemplary embodiment of the present invention. Here, float system 400 includes a housing 402 incorporating a float member 404. Here, float member 404 is contained inside housing 402 using support members 406.

Figure 6:
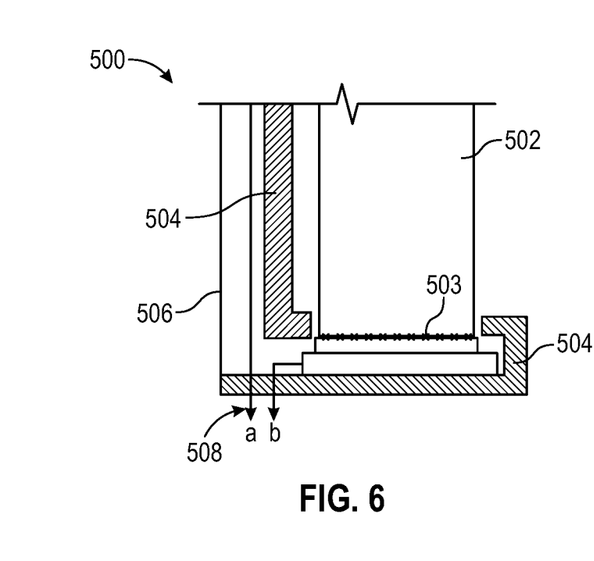

FIG. 6 shows an enclosed variation of a float system 500, in accordance with one embodiment of the present invention. Here, float system 500 includes a float member 502. Float member 502 is surrounded by housing 504. Housing 504 is made of a rigid material to withstand and resist impact from reaching float member 502. In one alternate implementation, housing 504 surrounds by a diaphragm 506. Diaphragm 506 helps to measure the pressure of the fluid in float system 500. Float member 502 includes one or more force sensors 508 positioned at its edges or sides. In one example, float member 502 connects to housing 504 with the help of connecting means 503 such as adhesive.

Figure 7:
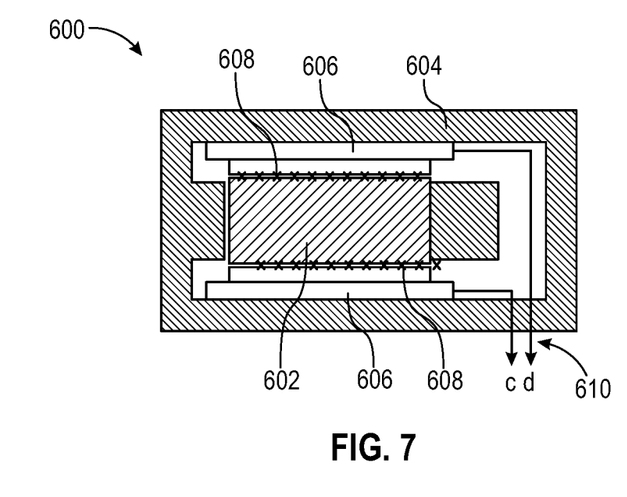
FIG. 7 illustrates an enclosed variation of a sink system, in accordance with one embodiment of the present invention.

FIG. 7 shows an enclosed variation of a sink system 600 in accordance with one embodiment of the present invention. Sink system 600 includes a sink member 602. Sink member 602 is surrounded by housing 604. Housing 604 is made of a rigid material to withstand and resist impact from reaching sink member 602. Sink member 602 includes one or more force sensors 606, 610 positioned at its edges or sides. In one example, sink member 602 connects to force sensors 606, 610 with the help of connecting means 608 such as adhesive.

Figure 8:
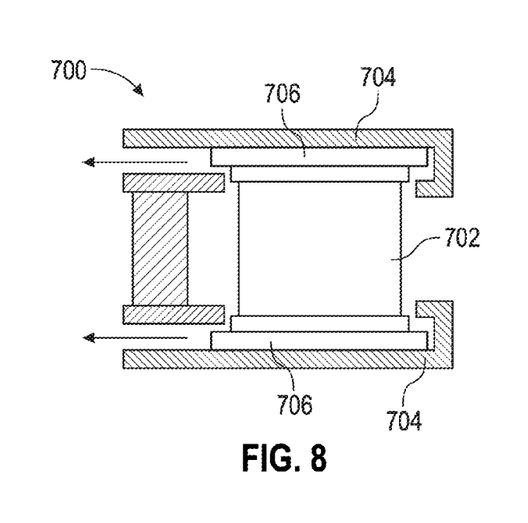
FIG. 8 illustrates a float system, in accordance with one embodiment of the present invention.

FIG. 8 shows a float system 700, in accordance with another embodiment of the present invention. Here, float system 700 includes a float member 702. Float member 702 comes in a cylindrical configuration. Float member 702 is surrounded by housing 704. Float member 702 encompasses force sensors 706. Float member 702 is attached to force sensors 706 with adhesive. The spacing on housing 704 is left to put both force sensors 706 in contact with the base of housing 704 even when there is no force acting on it (e.g., when the float system 700 is horizontal). In the present embodiment, the diameter of float member 702 is equal to that of force sensors 706. Further, the height of float member 702 is determined by the density of float member 702 such that the mass/weight of float member 702 is same as the sink member it is going to be paired with. Additionally, float system 700 is coated or dipped in a covering layer such as grease or any other solution to provide waterproof layer around force sensors 706. Optionally, silicone cover is added over housing 704 for additional protection. Alternatively, float member 702 is adhered to a thin waterproof layer that seals off force sensors 706 and/or housing 704.

Similarly, a sink system (not shown) is constructed to properly seal or enclose it from exposure to environment.

Figure 9:
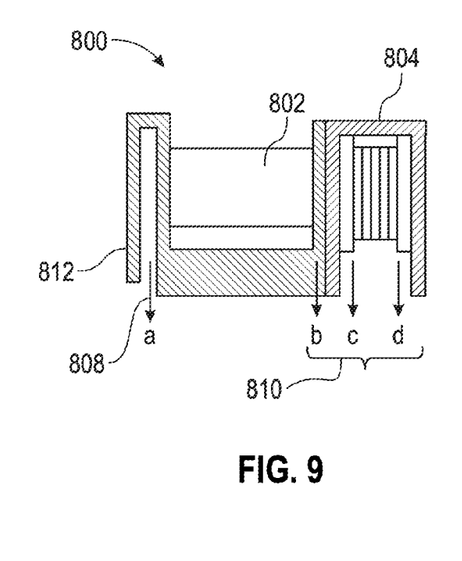
FIG. 9 illustrates a submersion sensor enclosed with the help of a diaphragm, in accordance with one embodiment of the present invention.
Figure 10:
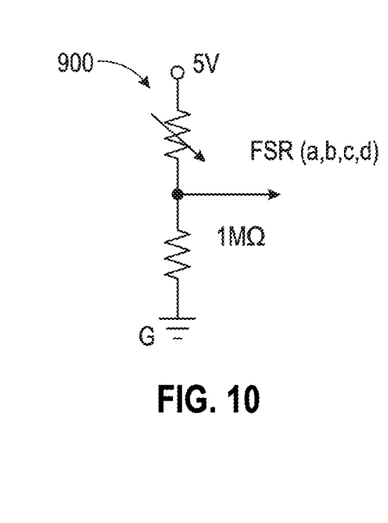
FIG. 10 illustrates a high-resistance resistor, in accordance with one embodiment of the present invention.

FIG. 9 shows a submersion sensor 800 enclosed with the help of a diaphragm, in accordance with one embodiment of the present invention. Submersion sensor 800 includes float member 802 and a sink member 804. Here, sink member 804 is much thinner than float member 802. This is because; sink member 804 is much denser with same mass as float member 802. Float member 802 includes a first force sensor (a) 808 and sink member 804 include second force sensors (b, c, d) 810. Further, submersion sensor 800 includes a diaphragm 812. Diaphragm 812 allows the pressure behind first force sensor 808 and second force sensors 810 to equalize with the pressure outside. In the present embodiment, each force sensor 808, 810 is paired with a high-resistance resistor (>1 MΩ). FIG. 10 shows a high-resistance resistor 900, in accordance with one exemplary embodiment of the present invention. Here, each force sensor 808, 810 is paired with high-resistance resistor 900 to increase its sensitivity to small forces i.e., the smaller the device, the higher the resistance. The sensitivity is increased to ensure different tolerances and different error conditions.

Figure 11:
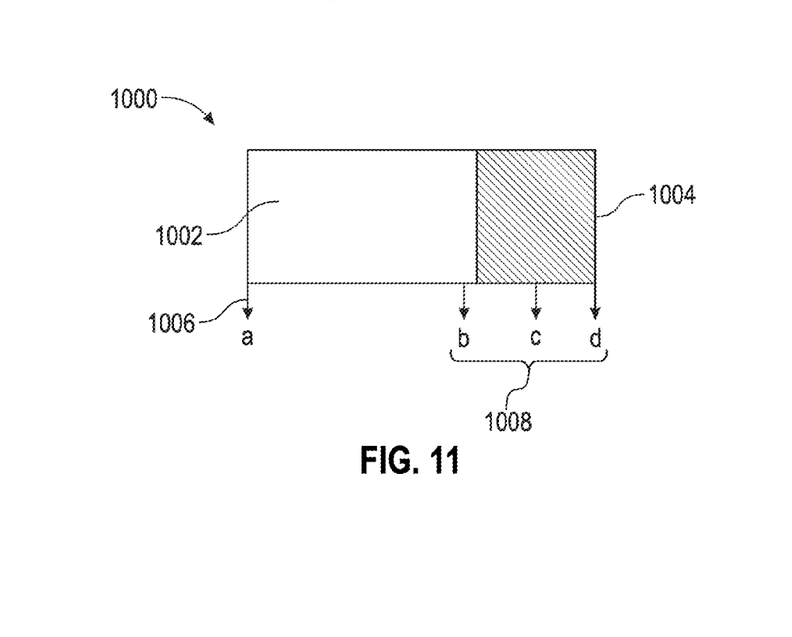
FIG. 11 illustrates a basic logic schematic diagram of a submersion sensor, in accordance with one embodiment of the present invention.

FIG. 11 shows a basic logic schematic diagram of submersion sensor 1000, in accordance with one embodiment of the present invention. Here, submersion sensor 1000 includes a single large float member 1002 and a single sink member 1004. Submersion sensor 1000 includes a first force sensor (a) 1006 at float member 1002, Further, submersion sensor 1000 includes multiple second force sensors (b, c, and d) 1008 placed at sink member 1004. In the present arrangement, a single float member 1002 and single sink member 1004 are used with different tolerances. Since single float member 1002 and single sink member 1004 are used, different error conditions may arise. For example, float member 1002 and single sink member 1004 may have tolerance and an error condition such as (a∧d)V(b∧c). In another example, the float member 1002 and single sink member 1004 may have tolerance and an error condition such as (c∧~a)V(a∧~c)V(d∧~b)V(b∧~d)=(c XOR a)V(d XOR b).

Figure 13:
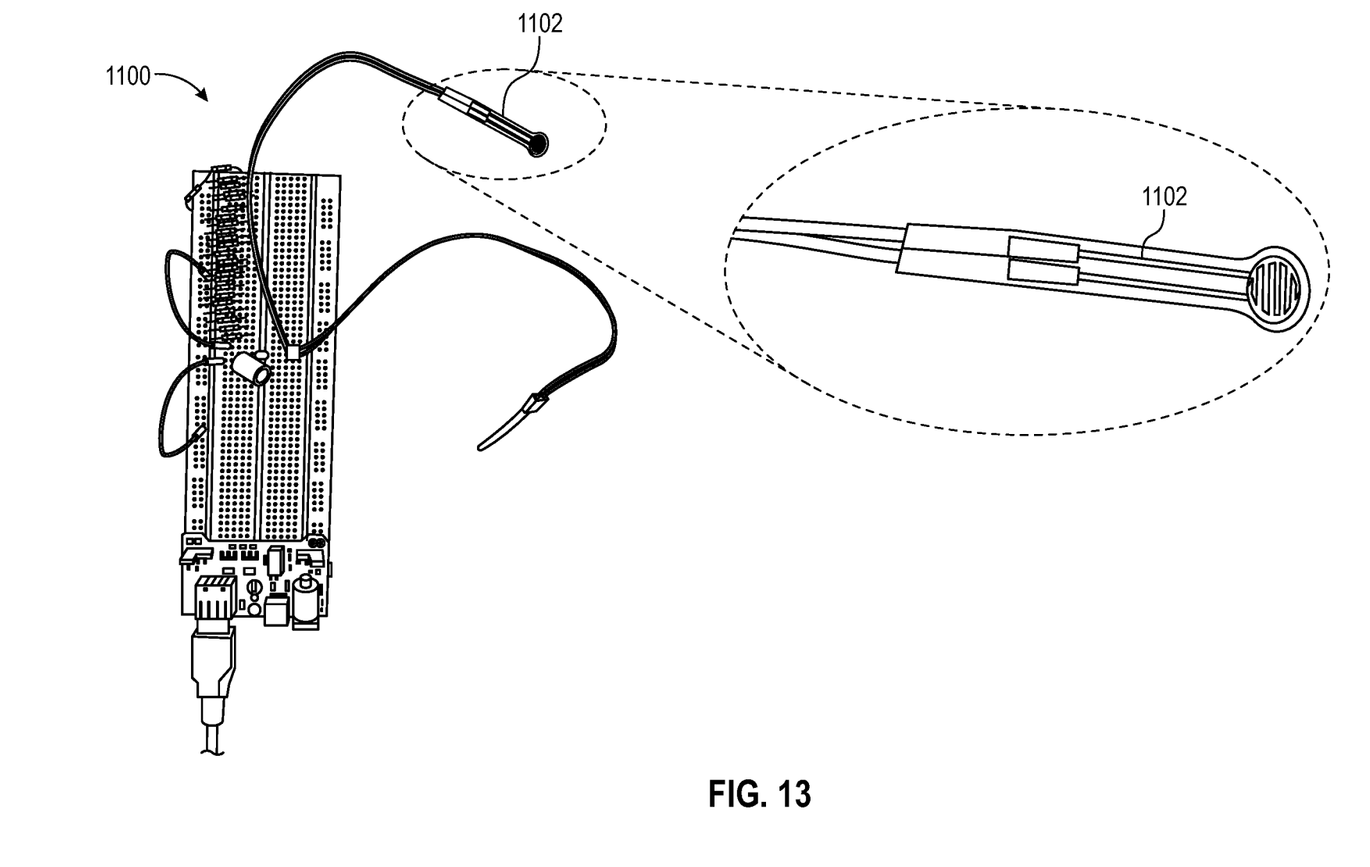
FIG. 13 illustrates a circuitry incorporating a force sensor, in accordance with one exemplary embodiment of the present invention.

In one implementation, one single unit is sufficient for most applications for detecting submersion of a system incorporating submersion sensor 1000. It is preferable to have submersion sensor 1000 in an arrangement 1050, as shown in FIG. 12 to reduce false positives. Arrangement 1050 shows a single float member having six sink members 1052 with six force sensors (A, B, C, D, E, F) 1054 in octahedron configuration. Here, the float member having six sink members implement the logic (A∧B)V(C∧D)V(E∧F) to reduce false positives. Further, FIG. 13 shows a circuitry 1100 incorporating force sensor 1102, in accordance with one exemplary embodiment of the present invention.

In accordance with another embodiment, the float members and the sink members are arranged so that a single float member is surrounded by multiple sink members, with one or more force sensors fixed between the float member and multiple sink members. In such an arrangement, if the sensitivity of the force sensors is such that the weight of the float member is not sufficient to activate them, but buoyant forces on the float member are sufficient to activate them, then activations of certain combinations of force sensors indicate that the system is submerged.

The two possible arrangements involving spherical floats affixed to sink members arranged along the faces of a circumscribing cube or tetrahedron provide several advantages over the prior art. For example, the presently disclosed sensor system can be tuned to be specific to a particular fluid density, or to be as general as possible to test against immersion in any fluid. The sensor system gives real-time readings about the submersion of objects, regardless of prior exposure. The sensors used in the system do not suffer corrosion as a direct consequence of their sensing functions. The system is not sensitive to the quality, cleanliness, conductivity, polarity, or any qualities of the submerging fluid other than its density. Further, the system will not give false positives for high humidity or incidental contact with a potentially submerging fluid. The presently disclosed sensor system can be implemented in wearable devices for uses like pool safety for young children or industrial safety around fluids other than water.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A submersion sensor, comprising:
   at least one float member and at least one sink member;
   force sensors positioned at distal ends of each of the at least one float member and the at least one sink member; and,
   a controller,
   wherein the controller determines submersion of the submersion sensor upon obtaining signals from the force sensors corresponding to opposite directional movement of the at least one float member and the at least one sink member in a fluid.

2. The submersion sensor of claim 1, wherein the at least one float member and the at least one sink member have equal mass.

3. The submersion sensor of claim 1, wherein the at least one float member and the at least one sink member are arranged in an axes of an octahedron configuration.

4. The submersion sensor of claim 3, wherein the octahedron configuration arrangement of the least one float member and the at least one sink member minimizes need for correction for dynamic forces on the force sensors.

5. The submersion sensor of claim 1, further comprises an alarm, and wherein the alarm produces sounds when the controller determines opposite directional movement of the at least one float member and the at least one sink member.

6. The submersion sensor of claim 1, wherein each of the force sensors is paired with a high-resistance resistor to increase sensitivity to small forces.

7. A system, comprising:
   a first housing comprising at least one float member;
   a second housing comprising at least one sink member;
   force sensors positioned between the at least one float member and the first housing, and the at least one sink member and the second housing; and,
   a controller,
   wherein the controller determines submersion of the system upon obtaining signals from the force sensors corresponding to opposite directional movement of the at least one float member and the at least one sink member in a fluid.

8. The system of claim 7, wherein the at least one float member connects to the first housing using adhesive.

9. The system of claim 7, wherein the at least one sink member connects to the second housing using adhesive.

10. The system of claim 7, wherein the at least one float member comprises a diaphragm, and wherein the diaphragm measures pressure of the fluid in the system.

11. The system of claim 7, wherein the system is coated with a covering layer to protect the force sensors from coming in contact with the fluid.

12. The system of claim 7, wherein the at least one float member and the at least one sink member have equal mass.

13. The system of claim 7, wherein the at least one float member and the at least one sink member are arranged in an axes of an octahedron configuration, and wherein the octahedron configuration arrangement minimizes need for correction for dynamic forces on the force sensors.

14. The system of claim 7, further comprises an alarm, and wherein the alarm produces sounds when the controller determines opposite directional movement of the at least one float member and the at least one sink member.

15. The system of claim 7, wherein each of the force sensors is paired with a high-resistance resistor to increase sensitivity to small forces.

16. A method of detecting submersion in a fluid, the method comprising steps of:
   providing at least one float member and at least one sink member;
   providing force sensors positioned at distal ends of each the at least one float member and the at least one sink member; and
   providing a controller for determining submersion of the submersion sensor upon obtaining signals from the force sensors corresponding to opposite directional movement of the at least one float member and the at least one sink member in a fluid.

17. The method of claim 16, further comprising providing the at least one float member and the at least one sink member having equal mass.

18. The method of claim 16, further comprising producing sounds upon the controller determining opposite directional movement of the at least one float member and the at least one sink member.

19. The method of claim 16, further comprising pairing each of the force sensors with a high-resistance resistor for increasing sensitivity to small forces.

20. The method of claim 16, further comprising providing a diaphragm at the at least one float member for measuring pressure of the fluid.

* * * * *